United States Patent
Ogata et al.

(10) Patent No.: US 9,876,210 B2
(45) Date of Patent: Jan. 23, 2018

(54) POROUS LAYER

(71) Applicant: Sumitomo Chemical Company, Limited, Chuo-Ku, Tokyo (JP)

(72) Inventors: Toshihiko Ogata, Osaka (JP); Chikara Murakami, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/398,231

(22) Filed: Jan. 4, 2017

(65) Prior Publication Data

US 2017/0263905 A1  Sep. 14, 2017

(30) Foreign Application Priority Data

Mar. 11, 2016 (JP) .................. 2016-048541
Jun. 27, 2016 (JP) .................. 2016-126600
Jun. 27, 2016 (JP) .................. 2016-127005

(51) Int. Cl.
H01M 2/16 (2006.01)

(52) U.S. Cl.
CPC ......... H01M 2/166 (2013.01); H01M 2/1673 (2013.01); H01M 2/1686 (2013.01)

(58) Field of Classification Search
CPC ... H01M 2/166; H01M 2/1686; H01M 2/1673
See application file for complete search history.

(56) References Cited

U.S. PATENT DOCUMENTS

| | | | | |
|---|---|---|---|---|
| 5,571,634 A | * | 11/1996 | Gozdz | C08J 9/28 429/223 |
| 6,395,419 B1 | * | 5/2002 | Kuwahara | H01G 9/0036 429/129 |
| 2014/0272505 A1 | | 9/2014 | Yoon et al. | |
| 2015/0236323 A1 | | 8/2015 | Honda et al. | |
| 2016/0268571 A1 | | 9/2016 | Honda | |

FOREIGN PATENT DOCUMENTS

| | | |
|---|---|---|
| CN | 102651466 A | 8/2012 |
| CN | 104051776 A | 9/2014 |
| EP | 834941 A1 | 4/1998 |
| JP | H11-16561 A | 1/1999 |
| JP | H11-86844 A | 3/1999 |
| JP | 2008-123996 | 5/2008 |
| JP | 2012-076255 A | 4/2012 |
| JP | 2012-104422 A | 5/2012 |
| JP | 2012-150972 A | 8/2012 |
| JP | 5553165 B2 | 7/2014 |
| JP | 2014-213500 A | 11/2014 |
| JP | 5876616 B1 | 3/2016 |
| KR | 10-1430975 B1 | 8/2014 |
| KR | 2014-0112668 A | 9/2014 |
| KR | 2014-0114428 A | 9/2014 |
| WO | 98/59384 A1 | 12/1998 |
| WO | 2013/133074 A1 | 9/2013 |
| WO | 2015099190 A1 | 7/2015 |

OTHER PUBLICATIONS

Solvay Solef PVDF, Design and Processing Guide, 2015.*
Office Action dated Dec. 6, 2016 in JP Application No. 2016-127005.
Office Action dated Sep. 28, 2016 in KR Application No. 10-2016-0087266.
Office Action dated Aug. 23, 2016 in JP Application No. 2016-127005.
Office Action dated Aug. 30, 2017 in CN Application No. 201611225799.

* cited by examiner

Primary Examiner — Carlos Barcena
(74) Attorney, Agent, or Firm — Panitch Schwarze Belisario & Nadel LLP

(57) ABSTRACT

As a nonaqueous electrolyte secondary battery porous layer having an excellent cycle characteristic, provided is a nonaqueous electrolyte secondary battery porous layer containing: an inorganic filler; and a polyvinylidene fluoride-based resin, the nonaqueous electrolyte secondary battery porous layer containing the inorganic filler in an amount of not less than 50% by weight relative to a total weight of the inorganic filler and the polyvinylidene fluoride-based resin, the polyvinylidene fluoride-based resin containing an α-form polyvinylidene fluoride-based resin and a β-form polyvinylidene fluoride-based resin, assuming that a sum of (i) an amount of the α-form polyvinylidene fluoride-based resin and (ii) an amount of the β-form polyvinylidene fluoride-based resin is 100 mol %, the amount of the α-form polyvinylidene fluoride-based resin being not less than 45 mol %.

11 Claims, No Drawings

500
POROUS LAYER

This Nonprovisional application claims priority under 35 U.S.C. §119 on Patent Application No. 2016-048541 filed in Japan on Mar. 11, 2016, Patent Application No. 2016-126600 filed in Japan on Jun. 27, 2016, and Patent Application No. 2016-127005 filed in Japan on Jun. 27, 2016, the entire contents of which are hereby incorporated by reference.

TECHNICAL FIELD

The present invention relates to a porous layer.

BACKGROUND ART

Nonaqueous electrolyte secondary batteries (hereinafter also referred to as a "nonaqueous secondary battery") such as a lithium secondary battery are currently in wide use as batteries for devices such as a personal computer, a mobile telephone, and a portable information terminal.

A device equipped with a lithium ion battery includes a wide variety of electrical protection circuits, provided in a battery charger or a battery pack, so that the battery operates normally and safely. However, if a breakdown or a malfunction, for example, occurs in the protection circuits, the lithium ion battery may be continuously recharged. This may cause oxidative and reductive degradation of an electrolyte on surfaces of a cathode and an anode both of which generate heat, oxygen release caused by decomposition of a cathode active material, and even deposition of metallic lithium on the anode. This may eventually cause the lithium ion battery to fall into a thermal runaway. There is also a danger that ignition or explosion may occur in the lithium ion battery, depending on the situation.

In order to safely stop a battery before such a dangerous thermal runaway occurs, most lithium ion batteries currently include, as a separator, a porous base material which contains a polyolefin as a main component and which has a shutdown function of clogging pores present in the porous base material when a temperature inside the battery is raised due to some defect and reaches approximately 130° C. to 140° C. Exhibition of the shutdown function at a temperature rise inside the battery stops passage of ions in the separator, and thus allows the battery to safely stop.

Meanwhile, the porous base material containing a polyolefin as a main component is poor in adhesiveness with respect to an electrode. This may cause a decrease in battery capacity and a deterioration of a cycle characteristic. With the aim of improving the adhesiveness of the porous base material with respect to an electrode, there have been developed (i) a separator in which a porous layer containing a polyvinylidene fluoride-based resin is laminated on at least one surface of the porous base material and (ii) an electrode on a surface of which a porous layer containing a polyvinylidene fluoride-based resin is laminated.

For example, Patent Literature 1 discloses a separator arranged such that a porous layer, containing (i) inorganic particles as heat-resistant particles and (ii) a polyvinylidene fluoride-based resin as a binder resin, is laminated on a surface of a porous film.

CITATION LIST

Patent Literature

[Patent Literature 1]
Japanese Patent Application Publication Tokukai No. 2008-123996 (Publication date: May 29, 2008)

SUMMARY OF INVENTION

Technical Problem

Unfortunately, the nonaqueous secondary batteries including the above-described conventional porous layer are poor in cycle characteristic.

Solution to Problem

The inventors of the present invention have studied a porous layer containing an inorganic filler and a polyvinylidene fluoride-based resin, which porous layer is a constituent member of a nonaqueous electrolyte secondary battery and particularly of a separator for a nonaqueous electrolyte secondary battery (hereinafter, also referred to as a nonaqueous electrolyte secondary battery separator or a nonaqueous secondary battery separator), and have focused attention on crystal forms of the polyvinylidene fluoride-based resin. The inventors have found that setting proportions of (i) a polyvinylidene fluoride-based resin having crystal form α and (ii) a polyvinylidene fluoride-based resin having crystal form β, each of which resins is contained in the polyvinylidene fluoride-based resin, to respective specific ranges allows the porous layer to be used as a constituent member of a nonaqueous secondary battery having an excellent cycle characteristic. As a result, the inventors have accomplished the present invention.

The present invention includes the following inventions shown in [1] through [11].

[1]
A nonaqueous electrolyte secondary battery porous layer comprising:
an inorganic filler; and
a polyvinylidene fluoride-based resin,
the nonaqueous electrolyte secondary battery porous layer containing the inorganic filler in an amount of not less than 50% by weight relative to a total weight of the inorganic filler and the polyvinylidene fluoride-based resin,
the polyvinylidene fluoride-based resin containing an α-form polyvinylidene fluoride-based resin and a β-form polyvinylidene fluoride-based resin,
assuming that a sum of (i) an amount of the α-form polyvinylidene fluoride-based resin contained in the polyvinylidene fluoride-based resin and (ii) an amount of the β-form polyvinylidene fluoride-based resin contained in the polyvinylidene fluoride-based resin is 100 mol %, the amount of the α-form polyvinylidene fluoride-based resin being not less than 45 mol %.

Note here that the amount of the α-form polyvinylidene fluoride-based resin is calculated by (a) waveform separation of (α/2) observed at around −76 ppm in a $^{19}$F-NMR spectrum obtained from the nonaqueous electrolyte secondary battery porous layer and (b) waveform separation of {(α/2)+β} observed at around −95 ppm in the $^{19}$F-NMR spectrum obtained from the nonaqueous electrolyte secondary battery porous layer.

[2]
The nonaqueous electrolyte secondary battery porous layer as set forth in [1], wherein, assuming that the sum of (i) the amount of the α-form polyvinylidene fluoride-based resin contained in the polyvinylidene fluoride-based resin and (ii) the amount of the β-form polyvinylidene fluoride-based resin contained in the polyvinylidene fluoride-based resin is 100 mol %, the amount of the α-form polyvinylidene fluoride-based resin is not less than 45 mol % and not more than 83 mol %.

[3]
The nonaqueous electrolyte secondary battery porous layer as set forth in [1] or [2], wherein the nonaqueous electrolyte secondary battery porous layer contains the inorganic filler in an amount of not less than 70% by weight and not more than 99% by weight relative to the total weight of the inorganic filler and the polyvinylidene fluoride-based resin.

[4]
The nonaqueous electrolyte secondary battery porous layer as set forth in any one of [1] through [3], wherein the polyvinylidene fluoride-based resin is polyvinylidene fluoride, a polyvinylidene fluoride copolymer, or a mixture of the polyvinylidene fluoride and the polyvinylidene fluoride copolymer.

[5]
The nonaqueous electrolyte secondary battery porous layer as set forth in any one of [1] through [4], wherein the polyvinylidene fluoride-based resin has a weight-average molecular weight of not less than 300,000 and not more than 3,000,000.

[6]
The nonaqueous electrolyte secondary battery porous layer as set forth in any one of [1] through [5], wherein:
the inorganic filler contains silicon (Si) and/or a silicon compound; and
the inorganic filler contains the silicon (Si) in an amount of not more than 2,000 ppm relative to a total weight of the inorganic filler.

[7]
A laminated body including:
a porous base material containing a polyolefin-based resin as a main component; and
a nonaqueous electrolyte secondary battery porous layer recited in any one of [1] through [6],
the nonaqueous electrolyte secondary battery porous layer being laminated on at least one surface of the porous base material.

[8]
A nonaqueous electrolyte secondary battery separator including:
a porous base material containing a polyolefin-based resin as a main component; and
a nonaqueous electrolyte secondary battery porous layer recited in any one of [1] through [6],
the nonaqueous electrolyte secondary battery porous layer being laminated on at least one surface of the porous base material.

[9]
A nonaqueous electrolyte secondary battery electrode including:
one of a cathode sheet and an anode sheet; and
a nonaqueous electrolyte secondary battery porous layer recited in any one of [1] through [6],
the nonaqueous electrolyte secondary battery porous layer being laminated on at least one surface of the one of the cathode sheet and the anode sheet.

[10]
A nonaqueous electrolyte secondary battery member including:
a cathode;
a nonaqueous electrolyte secondary battery porous layer recited in any one of [1] through [6]; and
an anode,
the cathode, the nonaqueous electrolyte secondary battery porous layer, and the anode being provided in this order.

[11]
A nonaqueous electrolyte secondary battery including:
a nonaqueous electrolyte secondary battery porous layer recited in any one of [1] through [6].

Advantageous Effects of Invention

A porous layer in accordance with an embodiment of the present invention is suitably applicable to a constituent member of a nonaqueous secondary battery having an excellent cycle characteristic. Further, a laminated body in accordance with an embodiment of the present invention includes the porous layer, and is therefore suitably applicable to a constituent member of a nonaqueous secondary battery having an excellent cycle characteristic. Still further, a nonaqueous secondary battery separator in accordance with an embodiment of the present invention, an electrode for a nonaqueous secondary battery (hereinafter, also referred to as a nonaqueous electrolyte secondary battery electrode or a nonaqueous secondary battery electrode) in accordance with an embodiment of the present invention, a member for a nonaqueous electrolyte secondary battery (hereinafter, also referred to as a nonaqueous electrolyte secondary battery member or a nonaqueous secondary battery member) in accordance with an embodiment of the present invention, and a nonaqueous electrolyte secondary battery in accordance with an embodiment of the present invention each also include the porous layer, and therefore each have an excellent cycle characteristic.

DESCRIPTION OF EMBODIMENTS

The following description will discuss an embodiment of the present invention. The present invention is, however, not limited to such an embodiment. Further, the present invention is not limited to the description of the arrangements below, but may be altered in various ways by a skilled person within the scope of the claims. Any embodiment based on a proper combination of technical means disclosed in different embodiments is also encompassed in the technical scope of the present invention. In the present specification, any numerical range expressed as "A to B" means "not less than A and not greater than B" unless otherwise stated. Further, expressions "weight" and "mass" are the same in meaning, and expressions "% by weight" and "% by mass" are also the same in meaning.

[Embodiment 1: Porous layer]

A porous layer for a nonaqueous electrolyte secondary battery (hereinafter, also referred to as a nonaqueous electrolyte secondary battery porous layer or simply referred to as a porous layer) in accordance with Embodiment 1 of the present invention is a porous layer containing: an inorganic filler; and a polyvinylidene fluoride-based resin, the porous layer containing the inorganic filler in an amount of not less than 50% by weight relative to a total weight of the inorganic filler and the polyvinylidene fluoride-based resin, the polyvinylidene fluoride-based resin containing an α-form polyvinylidene fluoride-based resin and a β-form polyvinylidene fluoride-based resin, assuming that a sum of (i) an amount of the α-form polyvinylidene fluoride-based resin contained in the polyvinylidene fluoride-based resin and (ii) an amount of the β-form polyvinylidene fluoride-based resin contained in the polyvinylidene fluoride-based resin is 100 mol %, the amount of the α-form polyvinylidene fluoride-based resin being not less than 45 mol %. Note here that the amount of the α-form polyvinylidene fluoride-based resin is calculated by (a) waveform separation of (α/2) observed at around −76 ppm in a $^{19}$F-NMR spectrum obtained from the porous layer and (b) waveform separation of {(α/2)+β} observed at around −95 ppm in the $^{19}$F-NMR spectrum obtained from the porous layer.

The nonaqueous electrolyte secondary battery porous layer in accordance with an embodiment of the present invention is a porous layer used in a nonaqueous electrolyte secondary battery as a constituent member of a nonaqueous electrolyte secondary battery separator or as a constituent member of a nonaqueous electrolyte secondary battery electrode.

The porous layer in accordance with an embodiment of the present invention contains a polyvinylidene fluoride-based resin (PVDF-based resin). The porous layer (i) has therein pores connected to one another and (ii) allows a gas or a liquid to pass therethrough from one surface to the other. In a case where the porous layer in accordance with an embodiment of the present invention is used as a constituent member of a nonaqueous secondary battery separator, the porous layer can be an outermost layer of the separator and can be caused to adhere to an electrode as such. In a case where the porous layer in accordance with an embodiment of the present invention is used as a constituent member of a nonaqueous secondary battery electrode, the porous layer can be an outermost layer of the electrode and can be caused to adhere to a nonaqueous electrolyte secondary battery separator.

The porous layer in accordance with an embodiment of the present invention contains the PVDF-based resin in an amount of preferably not less than 3% by mass and not more than 50% by mass, more preferably not less than 5% by mass and not more than 30% by mass, relative to a total mass of the porous layer. It is preferable that the porous layer contain the PVDF-based resin in an amount of not less than 3% by mass, in terms of an improvement in adhesiveness of the PVDF-based resin with respect to an inorganic filler, that is, in terms of prevention of falling of the inorganic filler from the porous layer. Meanwhile, it is preferable that the porous layer contain the PVDF-based resin in an amount of not more than 50% by mass, in terms of a battery characteristic (in particular, ion permeability resistance) and heat resistance.

Examples of the PVDF-based resin include: homopolymers of vinylidene fluoride (i.e., polyvinylidene fluoride); copolymers (e.g., polyvinylidene fluoride copolymer) of vinylidene fluoride and any other monomer polymerizable with vinylidene fluoride; and mixtures of these polymers. Examples of the monomer polymerizable with vinylidene fluoride include hexafluoropropylene, tetrafluoroethylene, trifluoroethylene, trichloroethylene, and vinyl fluoride. Each of those monomers can be used solely or two or more kinds of the monomers can be used in combination. The PVDF-based resin can be synthesized through emulsion polymerization or suspension polymerization.

The PVDF-based resin contains, as its constitutional unit, vinylidene fluoride in an amount of normally not less than 85 mol %, preferably not less than 90 mol %, more preferably not less than 95 mol %, and still more preferably not less than 98 mol %. The PVDF-based resin which contains vinylidene fluoride in an amount of not less than 85 mol % allows the porous layer to easily achieve (i) a mechanical strength with which the porous layer can withstand a pressure applied during production of a battery and (ii) heat resistance with which the porous layer can withstand heat applied during the production of the battery.

In an another aspect, the porous layer preferably contains two kinds of PVDF-based resins (a first resin and a second resin described below) that are different from each other in, for example, amount of hexafluoropropylene.

The first resin: (i) a vinylidene fluoride-hexafluoropropylene copolymer containing hexafluoropropylene in an amount of more than 0 mol %, and not more than 1.5 mol % or (ii) a vinylidene fluoride homopolymer (containing hexafluoropropylene in an amount of 0 mol %).

The second resin: a vinylidene fluoride-hexafluoropropylene copolymer containing hexafluoropropylene in an amount of more than 1.5 mol %.

The porous layer which contains the two kinds of PVDF-based resins has improved adhesiveness with respect to an electrode, as compared with the porous layer which does not contain any one of the two kinds of PVDF-based resins. Furthermore, as compared with the porous layer which does not contain any one of the two kinds of PVDF-based resins, the porous layer which contains the two kinds of PVDF-based resins has improved adhesiveness with respect to other layer (e.g., porous base material layer) which is a constituent member of a nonaqueous secondary battery separator, and accordingly causes an increase in peel force which is required to peel the porous layer from the electrode. The first resin and the second resin are preferably mixed at a mixing ratio (mass ratio, the first resin:the second resin) of 15:85 to 85:15.

The PVDF-based resin has a weight-average molecular weight of preferably 300,000 to 3,000,000. The PVDF-based resin which has a weight-average molecular weight of not less than 300,000 allows the porous layer to achieve a mechanical property with which the porous layer can withstand a process of causing the porous layer to adhere to an electrode, and accordingly tends to allow the porous layer to adhere to the electrode sufficiently. Meanwhile, the PVDF-based resin which has a weight-average molecular weight of not more than 3,000,000 causes a coating solution, which is used to produce the porous layer, not to have a too high viscosity, and accordingly tends to be excellent in formability. The weight-average molecular weight of the PVDF-based resin is more preferably 300,000 to 2,000,000, and still more preferably 500,000 to 1,500,000.

The PVDF-based resin has a fibril diameter of preferably 10 nm to 1,000 nm, in terms of a cycle characteristic of a nonaqueous secondary battery containing the porous layer.

The porous layer in accordance with an embodiment of the present invention may contain other resin which is different from the PVDF-based resin. Examples of the other resin include: a styrene-butadiene copolymer; homopolymers or copolymers of vinyl nitriles such as acrylonitrile and methacrylonitrile; and polyethers such as polyethylene oxide and polypropylene oxide.

The porous layer in accordance with an embodiment of the present invention contains an inorganic filler. The porous layer contains the inorganic filler in an amount of not less than 50% by weight, preferably not less than 70% by weight and not more than 99% by weight, and more preferably not less than 90% by weight and not more than 98% by weight, relative to a total weight of the inorganic filler and the polyvinylidene fluoride-based resin. It is preferable that the porous layer contain the inorganic filler in an amount of not less than 50% by mass, in terms of heat resistance. Meanwhile, it is preferable that the porous layer contain the inorganic filler in an amount of not more than 99% by mass, in terms of adhesiveness of the inorganic filler with respect to the PVDF-based resin. The porous layer containing the inorganic filler can improve slidability and/or heat resistance of a separator including the porous layer. The inorganic filler is not limited to any particular one, provided that the inorganic filler is one that is stable in a nonaqueous electrolyte and is electrochemically stable. The inorganic filler preferably has a heat-resistant temperature of not less than 150° C. to ensure safety of a battery.

Examples of the inorganic filler include: metal hydroxides such as aluminum hydroxide, magnesium hydroxide, calcium hydroxide, chromium hydroxide, zirconium hydroxide, nickel hydroxide, and boron hydroxide; metal oxides, such as alumina and zirconia, and hydrates thereof; carbonates such as calcium carbonate and magnesium carbonate; sulfates such as barium sulfate and calcium sulfate; and clay minerals such as calcium silicate and talc. Among these inorganic fillers, a metal hydroxide, a hydrate of a metal oxide, or a carbonate is preferable in terms of achievement of fire retardance and/or improvement in safety of a battery, and a metal oxide is preferable in terms of insulation and oxidation resistance.

The inorganic filler preferably contains silicon (Si) and/or a silicon compound. In a case where the inorganic filler contains silicon (Si) and/or a silicon compound, the inorganic filler contains the silicon (Si) in an amount of preferably not more than 2,000 ppm, more preferably not less than 0.01 ppm and not more than 1,000 ppm, and still more preferably not less than 1 ppm and not more than 500 ppm, relative to a total weight of the inorganic filler. In a case where the inorganic filler contains the Si in an amount of more than 2,000 ppm relative to the total weight of the inorganic filler, this may cause a deterioration of the adhesiveness of the inorganic filler with respect to the polyvinylidene fluoride-based resin and may ultimately cause a deterioration of a battery characteristic.

Each of the inorganic fillers listed above can be used solely or two or more kinds of the inorganic fillers can be used in combination.

The inorganic filler has a volume average particle size of preferably 0.01 μm to 10 μm, in terms of (i) achievement of good adhesiveness and good slidability and (ii) formability of a laminated body. A lower limit of the volume average particle size is more preferably not less than 0.05 μm and still more preferably not less than 0.1 μm. An upper limit of the volume average particle size is more preferably not more than 5 μm and still more preferably not more than 1 μm.

The inorganic filler can take any form, and is not limited to any particular one. For example, the inorganic filler can take the form of particles having any shape, which may be a sphere, an ellipse, a plate-shape, a bar-shape, or an irregular shape. In terms of prevention of a short circuit in a battery, the inorganic filler preferably takes the form of (i) plate-shaped particles or (ii) primary particles which are not aggregated.

A filler forms fine bumps on a surface of a porous layer, thereby improving slidability. A filler made up of (i) plate-shaped particles or (ii) primary particles which are not aggregated forms finer bumps on a surface of a porous layer, so that the porous layer adheres to an electrode more favorably.

In terms of achievement of adhesiveness with respect to an electrode and achievement of a high energy density, the porous layer in accordance with an embodiment of the present invention has, on one surface of a porous base material, an average thickness of preferably 0.5 μm to 10 μm, and more preferably 1 μm to 5 μm.

The porous layer in accordance with an embodiment of the present invention is preferably made porous sufficiently, in terms of ion permeability. Specifically, the porous layer has a porosity of preferably 30% to 60%. The porous layer in accordance with an embodiment of the present invention has an average pore size of 20 nm to 100 nm.

The porous layer in accordance with an embodiment of the present invention has a surface roughness, in terms of a ten-point average roughness (Rz), of preferably 0.8 μm to 8.0 μm, more preferably 0.9 μm to 6.0 μm, and still more preferably 1.0 μm to 3.0 μm. A ten-point average roughness (Rz) is a value measured by a method according to JIS B 0601-1994 (or Rzjis of JIS B 0601-2001). Specifically, "Rz" is a value measured by use of ET4000 (manufactured by Kosaka Laboratory Ltd.) with a measurement length of 1.25 mm, a measurement rate of 0.1 mm/sec, a temperature of 25° C., and a humidity of 50% RH.

The porous layer in accordance with an embodiment of the present invention has a coefficient of kinetic friction of preferably 0.1 to 0.6, more preferably 0.1 to 0.4, and still more preferably 0.1 to 0.3. A coefficient of kinetic friction is a value measured by a method according to JIS K 7125. Specifically, a coefficient of kinetic friction in an embodiment of the present invention is a value measured by use of Surface Property Tester (manufactured by Heidon).

<Crystal Forms of PVDF-based Resin>

The PVDF-based resin contained in the porous layer in accordance with an embodiment of the present invention contains a PVDF-based resin having crystal form α (hereinafter, referred to as an α-form PVDF-based resin) and a PVDF-based resin having crystal form β (hereinafter, referred to as a β-form PVDF-based resin). Assuming that a sum of (i) an amount of the α-form PVDF-based resin contained in the PVDF-based resin and (ii) an amount of the β-form PVDF-based resin contained in the PVDF-based resin is 100 mol %, the amount of the α-form PVDF-based resin is not less than 45 mol %, preferably not less than 46 mol %, more preferably not less than 60 mol %, and still more preferably not less than 70 mol %. Furthermore, the amount of the α-form PVDF-based resin is preferably not more than 90 mol %, more preferably not more than 83 mol %, and still more preferably not more than 75 mol %. In other words, the amount of the α-form PVDF-based resin is preferably not less than 46 mol % and not more than 90 mol %, more preferably not less than 60 mol % and not more than 83 mol %, and still more preferably not less than 70 mol % and not more than 75 mol %. The porous layer, arranged such that the PVDF-based resin contains the α-form PVDF-based resin in an amount falling within any of the above ranges, can be used as a constituent member of a nonaqueous secondary battery having an excellent cycle characteristic, particularly as a constituent member of a separator for such a nonaqueous secondary battery or as a constituent member of an electrode for such a nonaqueous electrolyte secondary battery.

It is considered that, for the following reasons, the porous layer in accordance with an embodiment of the present invention can be used as a constituent member of a nonaqueous secondary battery having an excellent cycle characteristic.

Repeated charge and discharge of a nonaqueous electrolyte secondary battery cause an increase in temperature of an inside of the nonaqueous electrolyte secondary battery due to heat generated during the charge and discharge. Normally, a porous layer containing a PVDF-based resin, which porous layer is used as a nonaqueous electrolyte secondary battery member, is arranged such that the PVDF-based resin contains a β-form PVDF-based resin in an amount larger than that of an α-form PVDF-based resin, the β-form PVDF-based resin having a melting point lower than that of the α-form PVDF-based resin. An increase in temperature which increase results from repeated charge and discharge causes a plastic deformation of a binder resin (PVDF-based resin) contained in the porous layer serving as a nonaqueous electrolyte secondary battery member. Such a plastic deformation causes, for example, (i) a deformation of an inner structure of the porous layer and (ii) clogging of voids in the porous layer. This may ultimately cause a deterioration of ion permeability of the porous layer and may cause a deterioration of a cycle characteristic (rate characteristic after a cycle of charge and discharge) of a nonaqueous electrolyte secondary battery including the porous layer as a member.

In contrast, the porous layer in accordance with an embodiment of the present invention is arranged such that the PVDF-based resin contains the α-form PVDF-based resin, which is more excellent in heat resistance than the β-form PVDF-based resin (that is, which has a melting point higher than that of the β-form PVDF-based resin), in a proportion higher than that of an α-form PVDF-based resin contained in a PVDF-based resin which is contained in a general porous film used as a nonaqueous electrolyte secondary battery member. Therefore, it is considered that use of the porous layer in accordance with an embodiment of the present invention as a nonaqueous electrolyte secondary battery member makes it possible to suppress a plastic deformation of a binder resin (PVDF-based resin) which plastic deformation is caused by an increase in temperature which increase results from repeated charge and discharge. As a result, it is considered that, even in a case where charge and discharge is repeated, the ion permeability of the porous layer in accordance with an embodiment of the present invention is not deteriorated and, accordingly, a rate characteristic, after a cycle of charge and discharge, of a nonaqueous electrolyte secondary battery including the porous layer as a member is not deteriorated, so that the nonaqueous electrolyte secondary battery has an improved cycle characteristic.

An α-form PVDF-based resin is characterized by being made of a polymer containing the following PVDF skeleton. That is, the PVDF skeleton has a TGTG̅-type conformation in which there are two or more consecutive chains of a conformation such that, with respect to a fluorine atom (or a hydrogen atom) bonded to a carbon atom present in a main chain of a molecular chain of the skeleton, a hydrogen atom (or a fluorine atom) bonded to a neighboring carbon atom takes a trans conformation, and a hydrogen atom (or a fluorine atom) bonded to another (opposite) neighboring carbon atom takes a gauche conformation (positioned at an angle of 60°). The molecular chain is of TGTG̅ type and the dipole moments of C—$F_2$ and C—$H_2$ bonds have respective moieties oriented vertically and horizontally to the molecular chain.

In a $^{19}$F-NMR spectrum of the α-form PVDF-based resin, characteristic peaks appear at around −95 ppm and at around −78 ppm. Furthermore, in an IR spectrum of the α-form PVDF-based resin, characteristic peaks (characteristic absorptions) appear at around 1,212 $cm^{-1}$, at around 1,183 $cm^{-1}$, and at around 765 $cm^{-1}$. In powder X-ray diffraction analysis of the α-form PVDF-based resin, characteristic peaks appear at around 2θ=17.7°, at around 2θ=18.3°, and at around 2θ=19.9°.

A β-form PVDF-based resin is characterized by being made of a polymer containing the following PVDF skeleton. That is, the PVDF skeleton has a conformation such that a fluorine atom, bonded to a carbon atom present in a main chain of a molecular chain of the skeleton, and a hydrogen atom, bonded to a neighboring carbon atom, take a trans conformation (TT-type conformation), namely, the fluorine atom and the hydrogen atom bonded to the respective neighboring carbon atoms are positioned oppositely at an angle of 180 degrees when viewed from the carbon-carbon bond.

The β-form PVDF-based resin may be such that the PVDF skeleton has a TT-type conformation in its entirety. Alternatively, the β-form PVDF-based resin may be such that the PVDF skeleton has the TT-type conformation in part and has a molecular chain of the TT-type conformation in at least four consecutive PVDF monomer units. In any cases, the carbon-carbon bond, in which the TT-type conformation constitutes a TT-type trunk chain, has a planar zigzag structure, and the dipole moments of C—$F_2$ and C—$H_2$ bonds have moieties oriented vertically to the molecular chain.

In a $^{19}$F-NMR spectrum of the β-from PVDF-based resin, a characteristic peak appears at around −95 ppm. In an IR spectrum of the β-from PVDF-based resin, characteristic peaks (characteristic absorptions) appear at around 1,274 $cm^{-1}$, at around 1,163 $cm^{-1}$, and at around 840 $cm^{-1}$. In powder X-ray diffraction analysis of the β-from PVDF-based resin, a characteristic peak appears at around 2θ=21°.

<Method of Calculating Proportions of Amount of α-form PVDF-based Resin and Amount of β-form PVDF-Based Resin>

It is assumed that the sum of (i) the amount of the α-form PVDF-based resin and (ii) the amount of the β-form PVDF-based resin, each of which resins is contained in the PVDF-based resin that is contained in the porous layer in accordance with the an embodiment of present invention, is 100 mol %. In this case, a proportion of the amount of the α-form PVDF-based resin and a proportion of the amount of the β-form PVDF-based resin can be calculated from a $^{19}$F-NMR spectrum obtained from the porous layer. Specifically, the proportion of the amount of the α-form PVDF-based resin and the proportion of the amount of the β-form PVDF-based resin can be, for example, calculated as follows.

(1) An $^{19}$F-NMR spectrum is obtained from a porous layer containing a PVDF-based resin, under the following conditions.

Measurement Conditions

Measurement device: AVANCE400 manufactured by Bruker Biospin

Measurement method: single-pulse method

Observed nucleus: $^{19}$F

Spectral bandwidth: 200 kHz

Pulse width: 3.0 s (90° pulse)

Pulse repetition time: 10.0 s

Reference material: $C_6F_6$ (external reference: −163.0 ppm)

Temperature: 22° C.

Sample rotation frequency: 24 kHz (2) An integral value of a peak at around −78 ppm in the $^{19}$F-NMR spectrum obtained in (1) is calculated and is regarded as an α/2 amount.

(3) As with the case of (2), an integral value of a peak at around −95 ppm in the $^{19}$F-NMR spectrum obtained in (1) is calculated and is regarded as an {(α/2)+β} amount.

(4) Assuming that a sum of (i) an amount of an α-form PVDF-based resin contained in the PVDF-based resin and (ii) an amount of a β-form PVDF-based resin contained in the PVDF-based resin is 100 mol %, a proportion (hereinafter, also referred to as an α ratio) of the amount of the α-form PVDF-based resin is calculated, from the integral values obtained in (2) and (3), in accordance with the following Expression (1).

$$\alpha \text{ ratio(mol \%)}=[(\text{integral value at around }-78 \text{ ppm})\times 2/\{(\text{integral value at around }-95 \text{ ppm})-(\text{integral value at around }-78 \text{ ppm})\}]\times 100 \quad (1)$$

(5) Assuming that the sum of (i) the amount of the α-form PVDF-based resin contained in the PVDF-based resin and (ii) the amount of the β-form PVDF-based resin PVDF-based resin is 100 mol %, a proportion (hereinafter, also referred to as a β ratio) of the amount of the β-form PVDF-based resin is calculated, from the α ratio obtained in (4), in accordance with the following Expression (2).

$$\beta \text{ ratio(mol \%)}=100(\text{mol \%})-\alpha \text{ ratio(mol \%)} \quad (2)$$

[Method of Producing Porous Layer]

The porous layer in accordance with an embodiment of the present invention can be produced by, for example, a method similar to a method of producing a laminated body (later described) in accordance with an embodiment of the present invention, a method of producing a nonaqueous secondary battery separator (later described) in accordance with an embodiment of the present invention, and a method of producing a nonaqueous secondary battery electrode (later described) in accordance with an embodiment of the present invention.

[Embodiments 2, 3, and 4: Laminated Body, Nonaqueous Electrolyte Secondary Battery Separator, and Nonaqueous Electrolyte Secondary Battery Electrode]

The following description will discuss, as Embodiments 2, 3, and 4 of the present invention, a laminated body in accordance with an embodiment of the present invention, a nonaqueous electrolyte secondary battery separator in accordance with an embodiment of the present invention, and a nonaqueous electrolyte secondary battery electrode in accordance with an embodiment of the present invention.

The laminated body in accordance with an embodiment of the present invention includes: a porous base material containing a polyolefin-based resin as a main component; and a porous layer in accordance with Embodiment 1 of the present invention, the porous layer being laminated on at least one surface of the porous base material. The nonaqueous secondary battery separator in accordance with an embodiment of the present invention includes: a porous base material containing a polyolefin-based resin as a main component; and a porous layer in accordance with Embodiment 1 of the present invention, the porous layer being laminated on at least one surface of the porous base material. The nonaqueous secondary battery electrode in accordance with an embodiment of the present invention includes: one of a cathode sheet and an anode sheet; and a porous layer in accordance with Embodiment 1 of the present invention, the porous layer being laminated on at least one surface of the one of the cathode sheet and the anode sheet.

The following description will discuss (i) the porous base material which is included in each of the laminated body in accordance with an embodiment of the present invention and the nonaqueous secondary battery separator in accordance with an embodiment of the present invention, (ii) the cathode sheet and the anode sheet each of which is included in the nonaqueous secondary battery electrode in accordance with an embodiment of the present invention, (iii) a method of producing the laminated body in accordance with an embodiment of the present invention, (iv) a method of producing the nonaqueous secondary battery separator in accordance with an embodiment of the present invention, and (v) a method of producing the nonaqueous secondary battery electrode in accordance with an embodiment of the present invention.

<Porous Base Material>

The porous base material used in the laminated body in accordance with an embodiment of the present invention or in the nonaqueous secondary battery separator in accordance with an embodiment of the present invention only needs to be made of a porous and filmy base material containing a polyolefin as a main component (a polyolefin-based porous base material), and is preferably a microporous film. Namely, the porous base material is preferably a porous film that (i) contains a polyolefin as a main component, (ii) has therein pores connected to one another, and (iii) allows a gas or a liquid to pass therethrough from one surface to the other. The porous base material can be formed of a single layer or a plurality of layers.

The porous base material contains a polyolefin component at a proportion of normally not less than 50% by volume, preferably not less than 90% by volume, more preferably not less than 95% by volume, relative to whole components contained in the porous base material. The porous base material preferably contains, as the polyolefin component, a high molecular weight component having a weight-average molecular weight of $5 \times 10^5$ to $15 \times 10^6$. The porous base material particularly preferably contains, as the polyolefin component, a polyolefin component having a weight-average molecular weight of not less than 1,000,000. This allows (i) the porous base material, (ii) the whole of the laminated body including such a porous base material, and (iii) the whole of the nonaqueous secondary battery separator including such a porous base material to achieve higher strength.

Examples of the polyolefin include high molecular weight homopolymers and high molecular weight copolymers which homopolymers and copolymers are each obtained by polymerizing ethylene, propylene, 1-butene, 4-methyl-1-pentene, 1-hexene, and/or the like. The porous base material can be a layer containing one of these polyolefins and/or a layer containing two or more of these polyolefins. In particular, a high molecular weight polyethylene which is mainly made of ethylene is preferable. Note that the porous base material can contain other component which is different from the polyolefin, provided that the other component does not impair a function of the porous base material.

The porous base material has an air permeability of normally 30 sec/100 cc to 500 sec/100 cc, and preferably 50 sec/100 cc to 300 sec/100 cc, in terms of Gurley values. In a case where the porous base material which has an air permeability falling within the above range is used as a constituent member of a separator, the separator can achieve sufficient ion permeability.

A film thickness of the porous base material is determined as appropriate in consideration of the number of layers in the laminated body or in the nonaqueous secondary battery separator. Particularly in a case where the porous layer is formed on one surface (or both surfaces) of the porous base material, the porous base material has a film thickness of preferably 4 μm to 40 μm, and more preferably 7 μm to 30 μm.

The porous base material has a weight per unit area of normally 4 g/m$^2$ to 20 g/m$^2$, and preferably 5 g/m$^2$ to 12 g/m$^2$. This is because the porous base material which has such a weight per unit area makes it possible to increase not only strength, a thickness, handleability, and a weight of the laminated body but also a weight energy density and a volume energy density of a battery in a case where the porous base material is used as a constituent member of the nonaqueous secondary battery separator.

Suitable examples of such a porous base material include a porous polyolefin layer disclosed in Japanese Patent Application Publication, Tokukai, No. 2013-14017 A, a polyolefin porous film disclosed in Japanese Patent Application Publication, Tokukai, No. 2012-54229 A, and a polyolefin base material porous film disclosed in Japanese Patent Application Publication, Tokukai, No. 2014-040580 A.

The porous base material may be produced by any publicly known technique, and is not particularly limited to any specific method. For example, as disclosed in Japanese Patent Application Publication, Tokukaihei, No. 7-29563 A (1995), the porous base material may be produced by a method in which (i) a plasticizing agent is added to a thermoplastic resin to shape the thermoplastic resin into a film and then (ii) the plasticizing agent is removed with use of an appropriate solvent.

Specifically, in a case where, for example, the porous base material is produced from a polyolefin resin containing (i) an ultra-high molecular weight polyethylene and (ii) a low molecular weight polyolefin having a weight-average molecular weight of not more than 10,000, the porous base material is, in terms of production costs, preferably produced by the method including the following steps (1) to (4):

(1) kneading (i) 100 parts by weight of a ultra-high molecular weight polyethylene, (ii) 5 parts by weight to 200 parts by weight of a low molecular weight polyolefin having a weight-average molecular weight of not more than 10,000, and (iii) 100 parts by weight to 400 parts by weight of an inorganic filler, such as calcium carbonate, to obtain a polyolefin resin composition;

(2) shaping the polyolefin resin composition into a sheet;

(3) removing the inorganic filler from the sheet obtained in the step (2); and (4) stretching the sheet obtained in the step (3).

Alternatively, the porous base material may be produced by any one of methods disclosed in the above-described Patent Literatures.

The porous base material may alternatively be a commercially available product having the above physical properties.

The porous base material is more preferably subjected to a hydrophilization treatment before the porous layer is formed on the porous base material, that is, before the porous base material is coated with a coating solution later described. Subjecting the porous base material to the hydrophilization treatment further improves coating easiness of the coating solution, and accordingly allows the porous layer which is more uniform to be formed. This hydrophilization treatment is effective in a case where a solvent (dispersion medium) contained in the coating solution has a high proportion of water. Specific examples of the hydrophilization treatment include publicly known treatments such as (i) a chemical treatment involving an acid, an alkali, or the like, (ii) a corona treatment, and (iii) a plasma treatment. Among these hydrophilization treatments, the corona treatment is more preferable because the corona treatment makes it possible to not only hydrophilize the porous base material within a relatively short time period, but also hydrophilize only a surface and its vicinity of the porous base material to leave an inside of the porous base material unchanged in quality.

The porous base material may be arranged, as necessary, such that a porous layer other than the porous layer in accordance with Embodiment 1 of the present invention is formed on the porous base material. Examples of such other porous layer include publicly known porous layers such as a heat-resistant layer, an adhesive layer, and a protective layer. Specific examples of the other porous layer include a porous layer identical in composition to the porous layer in accordance with Embodiment 1 of the present invention.

<Cathode Sheet>

The cathode sheet is normally a sheet that can be used as a cathode of a nonaqueous electrolyte secondary battery or as a member of a cathode of a nonaqueous electrolyte secondary battery. The cathode sheet has a structure such that an active material layer containing a cathode active material and a binder resin is formed on a current collector. The active material layer may further include a conductive auxiliary agent.

Examples of the cathode active material include lithium-containing transition metal oxides, specific examples of which include $LiCoO_2$, $LiNiO_2$, $LiMn_{1/2}Ni_{1/2}O_2$, $LiCo_{1/3}Mn_{1/3}Ni_{1/3}O_2$, $LiMn_2O_4$, $LiFePO_4$, $LiCo_{1/2}Ni_{1/2}O_2$, and $LiAl_{1/4}Ni_{3/4}O_2$.

Examples of the binder resin in the cathode include PVDF-based resins.

Examples of the conductive auxiliary agent include carbon materials such as acetylene black, Ketjenblack, and graphite powder.

Examples of the current collector in the cathode include aluminum foil, titanium foil, and stainless steel foil each having a thickness of 5 μm to 20 μm.

<Anode Sheet>

The anode sheet is a sheet that can be used as an anode of a nonaqueous electrolyte secondary battery or as a member of an anode of a nonaqueous electrolyte secondary battery. The anode sheet has a structure such that an active material layer containing an anode active material and a binder resin is formed on a current collector. The active material layer may further include a conductive auxiliary agent.

Examples of the anode active material include materials each of which can electrochemically store lithium. Specific examples of such materials include carbon materials; and alloys of (i) lithium and (ii) silicon, tin, aluminum, or the like.

Examples of the binder resin in the anode include PVDF-based resins and styrene-butadiene rubber. According to a nonaqueous secondary battery in accordance with an embodiment of the present invention, even in a case where styrene-butadiene rubber is used as the binder resin in the anode, it is possible for the active material layer to achieve sufficient adhesiveness with respect to the current collector.

Examples of the conductive auxiliary agent in the anode include carbon materials such as acetylene black, Ketjenblack, and graphite powder.

Examples of the current collector in the anode include copper foil, nickel foil, and stainless steel foil each having a thickness of 5 μm to 20 μm. Instead of the anode described above, metallic lithium foil may be employed as the anode.

<Method of Producing Laminated Body and Method of Producing Nonaqueous Electrolyte Secondary Battery Separator>

The method of producing the laminated body in accordance with Embodiment 2 of the present invention and the method of producing the nonaqueous electrolyte secondary battery separator in accordance with Embodiment 3 of the present invention are not limited to any particular ones, and various methods can be employed.

For example, the laminated body and the nonaqueous electrolyte secondary battery separator can be each produced by forming a porous layer, containing an inorganic filler and a PVDF-based resin, on a surface of a polyolefin-based-resin microporous film, serving as a porous base material, by any one of the following steps (1) through (3). The steps (2) and (3) each further involve drying a deposited porous layer to remove a solvent. Note that a coating solution used in each of the steps (1) through (3) is preferably a coating solution in which the inorganic filler is dispersed and in which the PVDF-based resin is dissolved.

(1) Step of (i) coating a surface of a porous base material with a coating solution containing fine particles of an inorganic filler and fine particles of a PVDF-based resin, each of which inorganic filler and PVDF-based resin is for forming a porous layer, and then (ii) drying the coating solution to remove a solvent (dispersion medium) contained in the coating solution, so that a porous layer is formed.

(2) Step of (i) coating a surface of a porous base material with a coating solution containing an inorganic filler and a PVDF-based resin, each of which inorganic filler and PVDF-based resin is for forming a porous layer, and then (ii) immersing the porous base material in a deposition solvent, which is a poor solvent with respect to the PVDF-based resin, to deposit a porous layer containing the inorganic filler and the PVDF-based resin.

(3) Step of (i) coating a surface of a porous base material with a coating solution containing an inorganic filler and a PVDF-based resin, each of which inorganic filler and PVDF-based resin is for forming a porous layer, and then (ii) making the coating solution acidic with use of a low-boiling organic acid to deposit a porous layer containing the inorganic filler and the PVDF-based resin.

The solvent (dispersion medium) contained in the coating solution is not limited to any particular one, provided that the solvent is a solvent which does not adversely affect the porous base material, in which the PVDF-based resin can be uniformly and stably dissolved or dispersed, and in which the inorganic filler can be uniformly and stably dispersed. Examples of the solvent (dispersion medium) include N-methylpyrrolidone, N,N-dimethylacetamide, N,N-dimethylformamide, acetone, and water.

The deposition solvent can be, for example, a solvent (hereinafter, also referred to as a "solvent X"), other than the solvent (dispersion medium) contained in the coating solution, which solvent X is dissolvable in the solvent (dispersion medium) contained in the coating solution and which solvent X does not dissolve the PVDF-based resin contained in the coating solution. The solvent (dispersion medium) can be efficiently removed from the coating solution by (i) immersing, in the solvent X, the porous base material to which the coating solution has been applied to form a coating film, (ii) replacing, with the solvent X, the solvent (dispersion medium) contained in the coating film formed on the porous base material or a support, and then (iii) evaporating the solvent X. For example, isopropyl alcohol or t-butyl alcohol is preferably used as the deposition solvent.

In the step (3), the low-boiling organic acid can be, for example, paratoluene sulfonic acid, acetic acid, or the like.

Normally, an amount (weight per unit area) of a solid content of the porous layer which is applied to one surface of the porous base material is preferably 0.5 g/m$^2$ to 20 g/m$^2$, more preferably 0.5 g/m$^2$ to 10 g/m$^2$, still more preferably 0.5 g/m$^2$ to 1.5 g/m$^2$, in terms of adhesiveness with respect to an electrode and in terms of ion permeability. That is, it is preferable to control an amount of the coating solution, to be applied to the porous base material, so that an applied amount (weight per unit area) of the porous layer in an obtained laminated body and in an obtained nonaqueous secondary battery separator falls within the above range.

In a case where the laminated body which further includes other layer such as a heat-resistant layer is produced, such a heat-resistant layer may be formed by a method similar to the above method, except that the resin for forming the porous layer is replaced with a resin for forming the heat-resistant layer.

According to Embodiments 2 and 3, in any of the steps (1) through (3), by varying an amount of the resin for forming the porous layer which resin is dissolved or dispersed in the solution, it is possible to adjust a volume of the resin which absorbs an electrolyte, per square meter of the porous layer that has been immersed in the electrolyte.

Furthermore, by varying an amount of the solvent in which the resin for forming the porous layer is dissolved or dispersed, it is possible to adjust a porosity and an average pore diameter of the porous layer which has been immersed in the electrolyte.

<Method of Producing Nonaqueous Electrolyte Secondary Battery Electrode>

The method of producing the nonaqueous electrolyte secondary battery electrode in accordance with Embodiment 4 of the present invention is not limited to any particular one, and various methods can be employed. Note that a coating solution used in each of the following steps (1) through (3) is preferably a coating solution in which an inorganic filler is dispersed and in which a PVDF-based resin is dissolved.

For example, the nonaqueous electrolyte secondary battery electrode can be produced by using, in the method of producing the laminated body in accordance with Embodiment 2 of the present invention and in the method of producing the nonaqueous electrolyte secondary battery separator in accordance with Embodiment 3 of the present invention, the cathode sheet or the anode sheet each described earlier, instead of the porous base material containing a polyolefin-based resin as a main component. Specifically, the nonaqueous electrolyte secondary battery electrode can be produced by forming a porous layer, containing an inorganic filler and a PVDF-based resin, by any one of the following steps (1) through (3). The steps (2) and (3) each further involve drying a deposited porous layer to remove a solvent.

(1) Step of (i) coating a surface of a cathode sheet or an anode sheet with a coating solution containing fine particles of an inorganic filler and fine particles of a PVDF-based resin, each of which inorganic filler and PVDF-based resin is for forming a porous layer, and then (ii) drying the coating solution to remove a solvent (dispersion medium) contained in the coating solution, so that a porous layer is formed.

(2) Step of (i) coating a surface of a cathode sheet or an anode sheet with a coating solution in which an inorganic filler and a PVDF-based resin are dissolved, each of which inorganic filler and PVDF-based resin is for forming a porous layer, and then (ii) immersing the cathode sheet or the anode sheet in a deposition solvent, which is a poor solvent with respect to the PVDF-based resin, to deposit a porous layer containing the inorganic filler and the PVDF-based resin.

(3) Step of (i) coating a surface of a cathode sheet or an anode sheet with a coating solution in which an inorganic filler and a PVDF-based resin are dissolved, each of which inorganic filler and PVDF-based resin is for forming a porous layer, and then (ii) making the coating solution acidic with use of a low-boiling organic acid to deposit a porous layer containing the inorganic filler and the PVDF-based resin.

The solvent (dispersion medium) contained in the coating solution is not limited to any particular one, provided that the solvent is a solvent which does not adversely affect the cathode sheet or the anode sheet (i.e., a quality of the electrode), in which the PVDF-based resin can be uniformly and stably dissolved or dispersed, and in which the inorganic filler can be uniformly and stably dispersed. Examples of the solvent (dispersion medium) include N-methylpyrrolidone, N,N-dimethylacetamide, N,N-dimethylformamide, acetone, and water.

The deposition solvent can be, for example, a solvent (hereinafter, also referred to as a "solvent X"), other than the solvent (dispersion medium) contained in the coating solution, which solvent X is dissolvable in the solvent (dispersion medium) contained in the coating solution and which solvent X does not dissolve the PVDF-based resin contained in the coating solution. The solvent (dispersion medium) can be efficiently removed from the coating solution by (i) immersing, in the solvent X, the cathode sheet or the anode sheet to which the coating solution has been applied to form a coating film, (ii) replacing, with the solvent X, the solvent (dispersion medium) contained in the coating film formed on the cathode sheet, the anode sheet, or a support, and then (iii) evaporating the solvent X. For example, isopropyl alcohol or t-butyl alcohol is preferably used as the deposition solvent.

In the step (3), the low-boiling organic acid can be, for example, paratoluene sulfonic acid, acetic acid, or the like.

Normally, an amount (weight per unit area) of a solid content of the porous layer which is applied to one surface of the cathode sheet or the anode sheet is preferably 0.5 g/m² to 20 g/m², more preferably 0.5 g/m² to 10 g/m², still more preferably 0.5 g/m² to 1.5 g/m², in terms of adhesiveness with respect to the cathode sheet or the anode sheet and in terms of ion permeability. That is, it is preferable to control an amount of the coating solution, to be applied to the cathode sheet or the anode sheet, so that an applied amount (weight per unit area) of the porous layer in an obtained laminated body and in an obtained nonaqueous electrolyte secondary battery electrode falls within the above range.

In a case where the nonaqueous electrolyte secondary battery electrode which further includes other layer such as a heat-resistant layer is produced, such a heat-resistant layer may be formed by a method similar to the above method, except that the resin for forming the porous layer is replaced with a resin for forming the heat-resistant layer.

According to Embodiment 4, in any of the steps (1) through (3), by varying an amount of the resin for forming the porous layer which resin is dissolved or dispersed in the solution, it is possible to adjust a volume of the resin which absorbs an electrolyte, per square meter of the porous layer that has been immersed in the electrolyte.

Furthermore, by varying an amount of the solvent in which the resin for forming the porous layer is dissolved or dispersed, it is possible to adjust a porosity and an average pore diameter of the porous layer which has been immersed in the electrolyte.

<Method of Controlling Crystal Forms of PVDF-based Resin>

The laminated body in accordance with an embodiment of the present invention, the nonaqueous secondary battery separator in accordance with an embodiment of the present invention, and the nonaqueous secondary battery electrode in accordance with an embodiment of the present invention are each produced in such a manner that drying conditions (a drying temperature, a wind velocity and a wind direction during drying, and the like) and/or a deposition temperature (a deposition temperature at which a porous layer containing a PVDF-based resin is deposited with use of a deposition solvent or a low-boiling organic acid) in the above-described method are adjusted so as to control crystal forms of the PVDF-based resin to be contained in the porous layer. Specifically, the laminated body in accordance with an embodiment of the present invention, the nonaqueous secondary battery separator in accordance with an embodiment of the present invention, and the nonaqueous secondary battery electrode in accordance with an embodiment of the present invention can be produced in such a manner that the drying conditions and the deposition temperature are adjusted so that, assuming that a sum of (i) an amount of an α-form PVDF-based resin contained in the PVDF-based resin and (ii) an amount of a β-form PVDF-based resin contained in the PVDF-based resin is 100 mol %, the amount of the α-form PVDF-based resin is not less than 45 mol %.

The drying conditions and the deposition temperature, for attaining the PVDF-based resin arranged such that, assuming that the sum of (i) the amount of the α-form PVDF-based resin contained in the PVDF-based resin and (ii) the amount of the β-form PVDF-based resin contained in the PVDF-based resin is 100 mol %, the amount of the α-form PVDF-based resin is not less than 45 mol %, can be changed as appropriate according to a method of producing the porous layer, a solvent (disperse medium) as used, types of a deposition solvent and a low-boiling organic acid, and other conditions.

In a case where, as in the above-described step (1), the coating solution is simply dried without use of a deposition solvent, the drying conditions can be changed as appropriate according to the solvent contained in the coating solution, a concentration of the PVDF-based resin contained in the coating solution, an amount of the inorganic filler contained in the coating solution, the amount of the coating solution with which the porous base material is coated, and/or the like. In a case where the porous layer is formed in the step (1), the drying temperature is preferably 40° C. to 100° C., the wind direction of a hot wind during the drying is preferably vertical with respect to the porous base material, the cathode sheet, or the anode sheet each of which is coated with the coating solution, and the wind velocity during the drying is preferably 0.4 m/s to 40 m/s. Specifically, in a case where the coating solution, containing (i) N-methylpyrrolidone as the solvent in which the PVDF-based resin is dissolved, (ii) the PVDF-based resin in an amount of 1.0% by mass, and (iii) alumina in an amount of 9.0% by mass as the inorganic filler, is applied to the porous base material, the drying conditions are preferably set as follows: the drying temperature is 40° C. to 100° C.; the wind direction of the hot wind during the drying is vertical with respect to the porous base material, the cathode sheet, or the anode sheet each of which is coated with the coating solution; and the wind velocity is 0.4 m/s to 40 m/s.

In a case where the porous layer is formed in the above-described step (2), the deposition temperature is preferably 10° C. to 60° C., and the drying temperature is preferably 40° C. to 100° C. Specifically, in a case where the porous layer is formed in the step (2) with use of (i) N-methylpyrrolidone as the solvent in which the PVDF-based resin is dissolved and (ii) isopropyl alcohol as the deposition solvent, the deposition temperature is preferably 10° C. to 60° C., and the drying temperature is preferably 40° C. to 100° C.

[Embodiments 5 and 6: Nonaqueous Electrolyte Secondary Battery Member and Nonaqueous Electrolyte Secondary Battery]

The following description will discuss a nonaqueous electrolyte secondary battery member and a nonaqueous electrolyte secondary battery as Embodiments 5 and 6 of the present invention.

The nonaqueous secondary battery member in accordance with an embodiment of the present invention includes: a cathode; a porous layer in accordance with Embodiment 1 of the present invention; and an anode, the cathode, the porous layer, and the anode being provided in this order. The nonaqueous secondary battery in accordance with an embodiment of the present invention includes a porous layer in accordance with Embodiment 1 of the present invention. For example, the nonaqueous secondary battery is a lithium ion secondary battery that achieves an electromotive force through doping and dedoping with lithium, and includes a nonaqueous secondary battery member which includes a cathode, the porous layer in accordance with an embodiment of the present invention, a porous base material, and an anode, the cathode, the porous layer, the porous base material, and the anode being laminated in this order. The description below will take a lithium ion secondary battery as an example of the nonaqueous electrolyte secondary battery. Note that constituent elements, other than the porous layer, of the nonaqueous electrolyte secondary battery are not limited to those described below.

The nonaqueous secondary battery in accordance with an embodiment of the present invention only needs to include a cathode, an anode, and the porous layer in accordance with an embodiment of the present invention, and is not particularly limited in other arrangements. It is preferable that the nonaqueous secondary battery in accordance with an embodiment of the present invention further include a porous base material. The nonaqueous secondary battery in accordance with an embodiment of the present invention is normally configured such that a battery element is enclosed in an exterior member, the battery element including (i) a structure in which the anode and the cathode faces each other via a laminated body including, as has been described above, the porous layer in accordance with an embodiment of the present invention and the porous base material and (ii) an electrolyte with which the structure is impregnated. The nonaqueous secondary battery is preferably a nonaqueous electrolyte secondary battery, and is particularly preferably a lithium ion secondary battery. Note that the doping means storage, support, absorption, or insertion, and means a phenomenon in which lithium ions enter an active material of an electrode (e.g., a cathode). The nonaqueous secondary battery produced so as to include, as a nonaqueous secondary battery separator, the above-described laminated body in accordance with an embodiment of the present invention excels in handleability of the separator, and thus has a high production yield.

The cathode sheet described above can be normally used as the cathode of the nonaqueous secondary battery member.

As the cathode of the nonaqueous secondary battery, the cathode sheet described above can be used. Alternatively, the nonaqueous electrolyte secondary battery electrode in accordance with Embodiment 4 of the present invention can be used, the nonaqueous electrolyte secondary battery electrode including the cathode sheet and the porous layer in accordance with Embodiment 1 of the present invention which porous layer is laminated on the cathode sheet.

The anode sheet described above can be normally used as the anode of the nonaqueous secondary battery member.

As the anode of the nonaqueous secondary battery, the anode sheet described above can be used. Alternatively, the nonaqueous electrolyte secondary battery electrode in accordance with Embodiment 4 of the present invention can be used, the nonaqueous electrolyte secondary battery electrode including the anode sheet and the porous layer in accordance with Embodiment 1 of the present invention which porous layer is laminated on the anode sheet.

The electrolyte is a solution made of a nonaqueous solvent in which a lithium salt is dissolved. Examples of the lithium salt include $LiPF_6$, $LiBF_4$, and $LiClO_4$.

Examples of the nonaqueous solvent include all solvents generally used in a nonaqueous secondary battery, and the nonaqueous solvent is not limited to, for example, a mixed solvent (ethyl methyl carbonate, diethyl carbonate, and ethylene carbonate in a volume ratio of 50:20:30).

Examples of the nonaqueous solvent include cyclic carbonates such as ethylene carbonate, propylene carbonate, fluoroethylene carbonate, and difluoroethylene carbonate; chain carbonates such as dimethyl carbonate, diethyl carbonate, ethyl methyl carbonate, and fluorine substituents thereof; and cyclic esters such as γ-butyrolactone and γ-valerolactone. Each of these nonaqueous solvents can be used solely or two or more of these nonaqueous solvents can be used in combination.

The electrolyte is preferably one that is obtained by (i) preparing a solvent through mixing of a cyclic carbonate and a chain carbonate in a volume ratio (cyclic carbonate/chain carbonate) of 20/80 to 40/60 (more preferably 30/70) and (ii) dissolving, in the solvent, a lithium salt at a concentration of 0.5M to 1.5M.

Examples of the exterior member include a metal can and a pack which is made of an aluminum-laminated film. Examples of a shape of the battery include a square, a rectangular, a cylinder, a coin shape.

The nonaqueous secondary battery can be produced by, for example, (i) impregnating, with the electrolyte, a nonaqueous secondary battery member including the cathode sheet, the anode sheet, and the above-described laminated body which is provided, as a separator, between the cathode sheet and the anode sheet, (ii) causing the nonaqueous secondary battery member to be accommodated in the exterior member (e.g., a pack made of an aluminum-laminated layer film), and (iii) pressing the nonaqueous secondary battery member via the exterior member.

The laminated body, serving as a separator, in accordance with an embodiment of the present invention can be caused to adhere to an electrode by stacking the laminated body onto the electrode. Thus, although the above pressing is not an essential step for battery production in this case, it is preferable to carry out the pressing in order to enhance adhesion between an electrode and the laminated body, serving as a separator, in accordance with an embodiment of the present invention. Note that the pressing is preferably carried out, while an electrode and the laminated body, serving as a separator, in accordance with an embodiment of the present invention are heated (hot pressing), so as to further enhance adhesion between the electrode and the laminated body, serving as a separator, in accordance with an embodiment of the present invention.

A manner in which the laminated body, serving as a separator, in accordance with an embodiment of the present invention is provided between the cathode sheet and the anode sheet may be (i) a manner (so-called stack system) in which at least one cathode sheet, at least one laminated body, serving as a separator, in accordance with an embodiment of the present invention, and at least one anode sheet are laminated in this order or (ii) a manner in which the cathode sheet, a first laminated body, serving as a separator, in accordance with an embodiment of the present invention, the anode sheet, and a second laminated body, serving as a separator, in accordance with an embodiment of the present invention are stacked in this order and a stack thus obtained is wound up in a direction along a length of the stack.

As a method of producing the nonaqueous secondary battery member in accordance with an embodiment of the present invention and as a method of producing the nonaqueous secondary battery in accordance with an embodiment of the present invention, the above description has discussed a method of producing the nonaqueous secondary battery member which includes the laminated body, serving as a nonaqueous secondary battery separator, in accordance with an embodiment of the present invention and electrodes, the method including the steps of (i) producing the laminated body in accordance with an embodiment of the present invention, which laminated body includes the porous base material and the porous layer that is formed on the porous base material, and (ii) stacking the cathode sheet and the anode sheet so that the laminated body in accordance with an embodiment of the present invention is sandwiched between the cathode sheet and the anode sheet. However, the method of producing the nonaqueous secondary battery member in accordance with an embodiment of the present invention and the method of producing the nonaqueous secondary battery in accordance with an embodiment of the present invention are each not limited to this method.

For example, in another aspect, as the method of producing the nonaqueous secondary battery member in accordance with an embodiment of the present invention and as the method of producing the nonaqueous secondary battery in accordance with an embodiment of the present invention, a method can be employed in which the porous layer is formed by applying, to at least one surface of the cathode sheet or the anode sheet, a solution in which a PVDF-based resin to be contained in the porous layer is dissolved, that is, the nonaqueous electrolyte secondary battery electrode in accordance with Embodiment 4 of the present invention is used as an electrode. Then, the nonaqueous electrolyte secondary battery electrode, serving as the cathode, in accordance with Embodiment 4 of the present invention and the anode sheet are stacked so that the porous base material is sandwiched between the nonaqueous electrolyte secondary battery electrode and the anode sheet. Alternatively, the cathode sheet and the nonaqueous electrolyte secondary battery electrode, serving as the anode, in accordance with Embodiment 4 of the present invention are stacked so that the porous base material is sandwiched between the cathode sheet and the nonaqueous electrolyte secondary battery electrode. Alternatively, first and second nonaqueous electrolyte secondary battery electrodes, serving as the cathode and the anode, respectively, in accordance with Embodiment 4 of the present invention are stacked so that the porous base material is sandwiched between the first and the second nonaqueous electrolyte secondary battery electrodes. Thereafter, a resulting laminate is subjected to hot pressing so as to produce the nonaqueous secondary battery member which includes the laminated body, serving as a nonaqueous secondary battery separator, in accordance with an embodiment of the present invention and electrodes. In this case, the nonaqueous electrolyte secondary battery electrode in accordance with Embodiment 4 of the present invention only needs to be provided so that the porous layer faces the porous base material. This makes it possible to produce the nonaqueous secondary battery member in which the electrode, the porous layer, the porous base material, (porous layer), and the electrode are laminated in this order. As a result, the nonaqueous secondary battery can be produced in which the porous layer is provided between the electrode and the porous base material, the porous layer containing the inorganic filler and the PVDF-based resin that is arranged such that, assuming that a sum of (i) an amount of an $\alpha$-form PVDF-based resin contained in the PVDF-based resin and (ii) an amount of a $\beta$-form PVDF-based resin contained in the PVDF-based resin is 100 mol %, the amount of the $\alpha$-form PVDF-based resin is not less than 45 mol %.

The nonaqueous secondary battery in accordance with an embodiment of the present invention has an excellent cycle characteristic because it includes, as a separator, the laminated body including (i) the porous base material containing a polyolefin as a main component and (ii) the porous layer being laminated on one surface or both surfaces of the porous base material and containing the inorganic filler and the PVDF-based resin that is arranged such that, assuming that a sum of (i) an amount of an $\alpha$-form PVDF-based resin contained in the PVDF-based resin and (ii) an amount of a $\beta$-form PVDF-based resin contained in the PVDF-based resin is 100 mol %, the amount of the $\alpha$-form PVDF-based resin is not less than 45 mol %.

The present invention is not limited to the above-described embodiments, but may be altered in various ways by a skilled person within the scope of the claims. Any embodiment based on a proper combination of technical means disclosed in different embodiments is also encompassed in the technical scope of the present invention.

EXAMPLES

[Methods of Measuring Various Properties]

With respect to each of laminated bodies obtained in Examples 1 through 5 and Comparative Example 1 described below, an $\alpha$ ratio calculation and a cycle characteristic test were carried out by the following methods.

(1) $\alpha$ Ratio Calculation Method

An $\alpha$ ratio (%), indicative of a molar ratio (%) of an $\alpha$-form PVDF-based resin relative to a sum of (i) an amount of the $\alpha$-form PVDF-based resin and (ii) an amount of a $\beta$-form PVDF-based resin, each of which resins was contained in a PVDF-based resin that was contained in a porous layer of each of the laminated bodies obtained in Examples and Comparative Example described below, was measured by a method including the following steps (1) through (4).

(1) A piece having a size of approximately 2 cm×5 cm was cut out from a laminated body obtained in each of Examples and Comparative Example below, and a $^{19}$F-NMR spectrum was obtained from the piece under the following measurement conditions.

Measurement Conditions
Measurement device: AVANCE400 manufactured by Bruker Biospin
Measurement method: single-pulse method
Observed nucleus: $^{19}F$
Spectral bandwidth: 200 kHz
Pulse width: 3.0 s (90° pulse)
Pulse repetition time: 10.0 s
Reference material: $C_6F_6$ (external reference: −163.0 ppm)
Temperature: 22° C.
Sample rotation frequency: 24 kHz (2) An integral value of a peak at around −78 ppm in the $^{19}$F-NMR spectrum obtained in (1) was calculated and was regarded as an α/2 amount.

(3) As with the case of (2), an integral value of a peak at around −95 ppm in the $^{19}$F-NMR spectrum obtained in (1) was calculated and was regarded as an {(α/2)+β} amount.

(4) Assuming that a sum of (i) an amount of an α-form PVDF-based resin contained in a PVDF-based resin and (ii) an amount of a β-form PVDF-based resin contained in the PVDF-based resin was 100 mol %, a proportion of the amount of the α-form PVDF-based resin was calculated, from the integral values obtained in (2) and (3), in accordance with the following Expression (1).

$$\alpha \text{ ratio(mol \%)} = [(\text{integral value at around} -78 \text{ ppm}) \times 2/\{(\text{integral value at around} -95 \text{ ppm}) - (\text{integral value at around} -78 \text{ ppm})\}] \times 100 \quad (1)$$

(2) Cycle Characteristic Test

An IR drop in the 50th cycle of charge and discharge of each of nonaqueous electrolyte secondary batteries obtained in Examples 1 through 5 and Comparative Example 1 below was measured by the following method, and a cycle characteristic of the each of the nonaqueous electrolyte secondary batteries was evaluated.

A nonaqueous electrolyte secondary battery which had not been subjected to any cycle of charge and discharge was subjected to 4 cycles of initial charge and discharge. Each of the 4 cycles of the initial charge and discharge was carried out at a temperature of 25° C., at a voltage of 4.1 V to 2.7 V, and under an electric current of 0.2 C. Note here that 1 C indicates an electric current under which a rated capacity based on a discharge capacity at 1 hour rate is discharged for 1 hour. The same applies to the following description.

Subsequently, the nonaqueous electrolyte secondary battery was subjected to 50 cycles of charge and discharge. Each of the 50 cycles of the charge and discharge was carried out at a temperature of 55° C. and under a charge current of 1 C and a discharge current of 1 C, each of which charge and discharge currents was a constant current. A resistant value of the nonaqueous secondary battery after 10 seconds from a start of discharge in the 50th cycle was calculated, in accordance with the following Expression (3), as an IR drop in the 50th cycle.

$$\text{IR drop}(\Omega) \text{ in the 50th cycle} = (\text{voltage before discharge in the 50th cycle} - \text{voltage after 10 seconds from start of discharge in the 50th cycle})/\text{discharge current in the 50th cycle} \quad (3)$$

Example 1

[Production of Porous Layer and Laminated Body]

In N-methyl-2-pyrrolidone, a PVDF-based resin (manufactured by Kureha Corporation; product name "L#9305"; weight-average molecular weight of 1,000,000) was stirred and dissolved at 65° C. for 30 minutes so that a solid content was 10% by mass. A resultant solution was used as a binder solution. As an inorganic filler, alumina fine particles (manufactured by Sumitomo Chemical Co., Ltd.; product name "AKP3000"; containing 5 ppm of silicon) was used. The alumina fine particles, the binder solution, and a solvent (N-methyl-2-pyrrolidone) were mixed together in the following proportion. That is, the alumina fine particles, the binder solution, and the solvent were mixed together so that (i) a resultant mixed solution contained 10 parts by weight of the PVDF-based resin with respect to 90 parts by weight of the alumina fine particles and (ii) a solid content concentration (alumina fine particles+PVDF-based resin) of the mixed solution was 10% by weight. A dispersion solution was thus obtained. The dispersion solution thus obtained was stirred and mixed twice at 2,000 rpm for 30 seconds at a room temperature with use of a planetary centrifugal mixer (manufactured by Thinky Corporation; product name "AWATORI RENTARO"). The dispersion solution was then applied, as a coating solution, to a polyethylene porous film (having a thickness of 12 μm, a porosity of 44%, and an average pore size of 0.035 μm), serving as a porous base material, by a doctor blade method so that a solid content of the coating solution weighed 5 g per square meter. An applied object thus obtained, that is, a laminated body was dried at 40° C. and a wind velocity of 0.5 m/s so that a porous layer (1) was formed on the porous base material. A laminated body (1), serving as a nonaqueous electrolyte secondary battery laminated separator, was thus obtained. An α ratio of the porous layer (1) included in the laminated body (1) was measured by the above-described method. Table 1 shows a result of measuring the α ratio.

[Production of Nonaqueous Electrolyte Secondary Battery]

A nonaqueous electrolyte secondary battery (1) was produced by the following method with use of the laminated body (1) as a nonaqueous electrolyte secondary battery laminated separator.

<Production of Cathode>

A cathode was produced with use of a commercially-available cathode sheet which was produced by applying $LiNi_{0.5}Mn_{0.3}Co_{0.2}O_2$/electrically conductive material/PVDF (weight ratio 92/5/3) to aluminum foil. The aluminum foil of the cathode sheet was cut so that (i) a portion of the cathode sheet in which portion a cathode active material layer was formed had a size of 40 mm×35 mm and (ii) a portion in which the cathode active material layer was not formed and which had a width of 13 mm remained around that portion. The cathode sheet thus obtained was used as a cathode. The cathode active material layer had a thickness of 58 μm and a density of 2.50 g/cm$^3$.

<Production of Anode>

An anode was produced with use of a commercially-available anode sheet which was produced by applying graphite/styrene-1,3-butadiene copolymer/carboxymethyl cellulose sodium (weight ratio 98/1/1) to copper foil. The copper foil of the anode sheet was cut so that (i) a portion of the anode sheet in which portion an anode active material layer was formed had a size of 50 mm×40 mm and (ii) a portion in which the anode active material layer was not formed and which had a width of 13 mm remained around that portion. The anode sheet thus obtained was used as an anode. The anode active material layer had a thickness of 49 μm and a density of 1.40 g/cm$^3$.

<Assembly of Nonaqueous Electrolyte Secondary Battery>

In a laminate pouch, the cathode, the laminated body (1) serving as a nonaqueous electrolyte secondary battery laminated separator, and the anode were laminated (provided) in this order so as to obtain a nonaqueous electrolyte secondary battery member (1). In so doing, the cathode and the anode were provided so that a whole of a main surface of the cathode active material layer of the cathode was included in a range of a main surface (overlapped the main surface) of the anode active material layer of the anode.

Subsequently, the nonaqueous electrolyte secondary battery member was put in a bag made up of an aluminum layer and a heat seal layer laminated to the aluminum layer, and 0.22 mL of a nonaqueous electrolyte was poured into the bag. The nonaqueous electrolyte was an electrolyte which was obtained by dissolving 1.0 mol/L $LiPF_6$ in a mixed solvent of ethyl methyl carbonate, diethyl carbonate, and ethylene carbonate in a volume ratio of 50:20:30 and which had a temperature of 25° C. The bag was heat-sealed while a pressure inside the bag was reduced, so that a nonaqueous electrolyte secondary battery (1) was produced. An IR drop, in the 50th cycle, of the nonaqueous electrolyte secondary battery (1) was measured by the above-described method, and a cycle characteristic of the nonaqueous electrolyte secondary battery (1) was evaluated. Table 1 shows a result of measuring the IR drop.

Example 2

With use of a PVDF-based resin (manufactured by Arkema Inc.; product name "LBG"; weight-average molecular weight of 590.000) and, as an inorganic filler, alumina fine particles (manufactured by Sumitomo Chemical Co., Ltd.; product name "AES-12"; containing 190 ppm of silicon), a coating solution was prepared under conditions similar to those in Example 1, except that a solvent was mixed with the alumina fine particles and a binder solution so that a solid content concentration (alumina fine particles+PVDF-based resin) of a resultant mixed solution was 30% by weight. The coating solution thus obtained was applied to a polyethylene porous film (having a thickness of 12 μm, a porosity of 44%, and an average pore size of 0.035 μm), serving as a porous base material, by a doctor blade method so that a solid content of the coating solution weighed 5 g per square meter. An applied object thus obtained, that is, a laminated body was dried at 60° C. and a wind velocity of 1 (one) m/s so that a porous layer (2) was formed on the porous base material. A laminated body (2), serving as a nonaqueous electrolyte secondary battery laminated separator, was thus obtained. An α ratio of the porous layer (2) included in the laminated body (2) was measured by the above-described method.

Furthermore, in a manner similar to that in Example 1, a nonaqueous electrolyte secondary battery member (2) and a nonaqueous electrolyte secondary battery (2) were produced. An IR drop, in the 50th cycle, of the nonaqueous electrolyte secondary battery (2) was measured by the above-described method, and a cycle characteristic of the nonaqueous electrolyte secondary battery (2) was evaluated. Table 1 shows results of measuring the ac ratio and the IR drop.

Example 3

With use of a PVDF-based resin (manufactured by Arkema Inc.; product name "LBG"; weight-average molecular weight of 590.000), a coating solution was prepared under conditions similar to those in Example 1, except that a solvent was mixed with alumina fine particles and a binder solution so that a solid content concentration (alumina fine particles+PVDF-based resin) of a resultant mixed solution was 30% by weight. The coating solution thus obtained was applied to a polyethylene porous film (having a thickness of 12 μm, a porosity of 44%, and an average pore size of 0.035 μm), serving as a porous base material, by a doctor blade method so that a solid content of the coating solution weighed 5 g per square meter. An applied object thus obtained, that is, a laminated body was dried at 60° C. and a wind velocity of 2 m/s so that a porous layer (3) was formed on the porous base material. A laminated body (3), serving as a nonaqueous electrolyte secondary battery laminated separator, was thus obtained. An α ratio of the porous layer (3) included in the laminated body (3) was measured by the above-described method.

Furthermore, in a manner similar to that in Example 1, a nonaqueous electrolyte secondary battery member (3) and a nonaqueous electrolyte secondary battery (3) were produced. An IR drop, in the 50th cycle, of the nonaqueous electrolyte secondary battery (3) was measured by the above-described method, and a cycle characteristic of the nonaqueous electrolyte secondary battery (3) was evaluated. Table 1 shows results of measuring the α ratio and the IR drop.

Example 4

With use of a PVDF-based resin (manufactured by Solvay; product name "Solef#31508"), a coating solution was prepared under conditions similar to those in Example 1, except that a solvent was mixed with alumina fine particles and a binder solution so that a solid content concentration (alumina fine particles+PVDF-based resin) of a resultant mixed solution was 30% by weight. The coating solution thus obtained was applied to a polyethylene porous film (having a thickness of 12 μm, a porosity of 44%, and an average pore size of 0.035 μm), serving as a porous base material, by a doctor blade method so that a solid content of the coating solution weighed 5 g per square meter. An applied object thus obtained, that is, a laminated body was dried at 60° C. and a wind velocity of 20 m/s so that a porous layer (4) was formed on the porous base material. A laminated body (4), serving as a nonaqueous electrolyte secondary battery laminated separator, was thus obtained. An α ratio of the porous layer (4) included in the laminated body (4) was measured by the above-described method.

Furthermore, in a manner similar to that in Example 1, a nonaqueous electrolyte secondary battery member (4) and a nonaqueous electrolyte secondary battery (4) were produced. An IR drop, in the 50th cycle, of the nonaqueous electrolyte secondary battery (4) was measured by the above-described method, and a cycle characteristic of the nonaqueous electrolyte secondary battery (4) was evaluated. Table 1 shows results of measuring the α ratio and the IR drop.

Example 5

In N-methyl-2-pyrrolidone, a PVDF-based resin (manufactured by Solvay; product name "Solef#31508") was stirred and dissolved at 65° C. for 30 minutes so that a solid content was 10% by mass. A resultant solution was used as a binder solution. As an inorganic filler, alumina fine particles (manufactured by Sumitomo Chemical Co., Ltd.; product name "AKP3000"; containing 5 ppm of silicon) was used. The alumina fine particles, the binder solution, and a solvent (N-methyl-2-pyrrolidone and acetone) were mixed together in the following proportion. That is, the alumina fine particles, the binder solution, and the solvent were mixed together so that (i) a resultant mixed solution contained 10 parts by weight of the PVDF-based resin with respect to 90 parts by weight of the alumina fine particles, (ii) a solid content concentration (alumina fine particles+ PVDF-based resin) of the mixed solution was 30% by weight, and (iii) the mixed solution contained 20 parts by weight of the acetone with respect to 50 parts by weight of the N-methyl-2-pyrrolidone. A dispersion solution was thus obtained. The dispersion solution thus obtained was stirred and mixed twice at 2,000 rpm for 30 seconds at a room temperature with use of a planetary centrifugal mixer (manufactured by Thinky Corporation; product name "AWATORI RENTARO"). The dispersion solution was then applied, as a coating solution, to a polyethylene porous film (having a thickness of 12 μm, a porosity of 44%, and an average pore size of 0.035 μm), serving as a porous base material, by a doctor blade method so that a solid content of the coating solution weighed 5 g per square meter. An applied object thus obtained, that is, a laminated body was dried at 60° C. and a wind velocity of 20 m/s so that a porous layer (5) was formed on the porous base material. A laminated body (5), serving as a nonaqueous electrolyte secondary battery laminated separator, was thus obtained. An $\alpha$ ratio of the porous layer (5) included in the laminated body (5) was measured by the above-described method.

Furthermore, in a manner similar to that in Example 1, a nonaqueous electrolyte secondary battery member (5) and a nonaqueous electrolyte secondary battery (5) were produced. An IR drop, in the 50th cycle, of the nonaqueous electrolyte secondary battery (5) was measured by the above-described method, and a cycle characteristic of the nonaqueous electrolyte secondary battery (5) was evaluated. Table 1 shows results of measuring the c ratio and the IR drop.

Comparative Example 1

[Production of Porous Layer and Laminated Body]

In a container, 6 parts by weight of an N-methyl-2-pyrrolidone (NMP) solution, containing a PVDF-based resin (manufactured by Kureha Corporation; product name "W#9300"; weight-average molecular weight of 1,000,000) at a solid content ratio of 15% by mass, and 10 parts by weight of N-methyl-2-pyrrolidone were put. A resultant solution was stirred at a room temperature until the PVDF-based resin was uniformed. To the solution, 30 parts by weight of alumina fine particles (manufactured by Sumitomo Chemical Co., Ltd.; product name "AKP3000"; containing 5 ppm of silicon), which are heat-resistant fine particles, were added in 4 parts. A resultant mixed solution was stirred and mixed twice at 2,000 rpm for 30 seconds at a room temperature with use of a planetary centrifugal mixer (manufactured by Thinky Corporation; product name "AWATORI RENTARO"). The mixed solution thus obtained was applied, as a coating solution, to a polyethylene porous film (having a thickness of 12 μm, a porosity of 44%, and an average pore size of 0.035 μm) by a doctor blade method so that a solid content of the coating solution weighed 5 g per square meter. An applied object thus obtained, that is, a laminated body was dried at 40° C. and a wind velocity of 0.2 m/s so that a comparative porous layer (1) was formed on the porous base material. A comparative laminated body (1), serving as a nonaqueous electrolyte secondary battery laminated separator, was thus obtained.

An ca ratio of the comparative porous layer (1) included in the comparative laminated body (1) was measured by the above-described method. Table 1 shows a result of measuring the $\alpha$ ratio.

[Production of Nonaqueous Electrolyte Secondary Battery]

A comparative nonaqueous electrolyte secondary battery member (1) and a comparative nonaqueous electrolyte secondary battery (1) were produced in a manner similar to that in Example 1, except that the comparative laminated body (1) was used, as a nonaqueous electrolyte secondary laminated separator, instead of the laminated body (1). An IR drop, in the 50th cycle, of the comparative nonaqueous electrolyte secondary battery (1) was measured by the above-described method, and a cycle characteristic of the comparative nonaqueous electrolyte secondary battery (1) was evaluated. Table 1 shows a result of measuring the IR drop.

TABLE 1

|  | $\alpha$ ratio | IR drop in 50th cycle |
| --- | --- | --- |
| Example 1 | 46% | 1.4 Ω |
| Example 2 | 70% | 1.5 Ω |
| Example 3 | 74% | 1.5 Ω |
| Example 4 | 83% | 1.8 Ω |
| Example 5 | 86% | 2.1 Ω |
| Comparative Example 1 | 32% | 3.6 Ω |

CONCLUSION

As is clear from results shown in Table 1, the nonaqueous electrolyte secondary battery (Examples 1 through 5) which included, as a nonaqueous electrolyte secondary battery separator or as a member of a nonaqueous electrolyte secondary battery electrode, the porous layer containing the inorganic filler and the PVDF-based resin and which was arranged such that the r ratio of the PVDF-based resin was not less than 45 mol % was lower, in IR drop in the 50th cycle, than the nonaqueous electrolyte secondary battery (Comparative Example 1) which was arranged such that the $\alpha$ ratio was less than 45 mol %. That is, it is confirmed that the nonaqueous electrolyte secondary battery obtained in each of Examples 1 through 5 was capable of suppressing an increase in internal resistance of the battery, which increase is caused by a charge and discharge cycle of the battery, and was therefore more excellent in cycle characteristic than the nonaqueous electrolyte secondary battery obtained in Comparative Example 1.

INDUSTRIAL APPLICABILITY

A porous layer in accordance with an embodiment of the present invention is suitably applicable to production of a nonaqueous secondary battery excellent in cycle characteristic. Therefore, a laminated body in accordance with an embodiment of the present invention, a nonaqueous secondary battery separator in accordance with an embodiment of the present invention, a nonaqueous secondary battery electrode in accordance with an embodiment of the present invention, and a nonaqueous secondary battery member in accordance with an embodiment of the present invention can be widely used in a field of production of a nonaqueous secondary battery.

The invention claimed is:

1. A nonaqueous electrolyte secondary battery porous layer comprising:
   an inorganic filler; and
   a polyvinylidene fluoride-based resin,
   the nonaqueous electrolyte secondary battery porous layer containing the inorganic filler in an amount of not less than 50% by weight relative to a total weight of the inorganic filler and the polyvinylidene fluoride-based resin,
   the polyvinylidene fluoride-based resin containing an α-form polyvinylidene fluoride-based resin and a β-form polyvinylidene fluoride-based resin,
   assuming that a sum of (i) an amount of the α-form polyvinylidene fluoride-based resin contained in the polyvinylidene fluoride-based resin and (ii) an amount of the β-form polyvinylidene fluoride-based resin contained in the polyvinylidene fluoride-based resin is 100 mol %, the amount of the α-form polyvinylidene fluoride-based resin being not less than 70 mol %,
   the amount of the α-form polyvinylidene fluoride-based resin being calculated by (a) waveform separation of (α/2) observed at around −76 ppm in a $^{19}$F-NMR spectrum obtained from the nonaqueous electrolyte secondary battery porous layer and (b) waveform separation of {(α/2)+β} observed at around −95 ppm in the $^{19}$F-NMR spectrum obtained from the nonaqueous electrolyte secondary battery porous layer.

2. The nonaqueous electrolyte secondary battery porous layer as set forth in claim 1, wherein, assuming that the sum of (i) the amount of the α-form polyvinylidene fluoride-based resin contained in the polyvinylidene fluoride-based resin and (ii) the amount of the (β-form polyvinylidene fluoride-based resin contained in the polyvinylidene fluoride-based resin is 100 mol %, the amount of the α-form polyvinylidene fluoride-based resin is not less than 70 mol % and not more than 83 mol %.

3. The nonaqueous electrolyte secondary battery porous layer as set forth in claim 1, wherein the nonaqueous electrolyte secondary battery porous layer contains the inorganic filler in an amount of not less than 70% by weight and not more than 99% by weight relative to the total weight of the inorganic filler and the polyvinylidene fluoride-based resin.

4. The nonaqueous electrolyte secondary battery porous layer as set forth in claim 1, wherein the polyvinylidene fluoride-based resin is polyvinylidene fluoride, a polyvinylidene fluoride copolymer, or a mixture of the polyvinylidene fluoride and the polyvinylidene fluoride copolymer.

5. The nonaqueous electrolyte secondary battery porous layer as set forth in claim 1, wherein the polyvinylidene fluoride-based resin has a weight-average molecular weight of not less than 300,000 and not more than 3,000,000.

6. The nonaqueous electrolyte secondary battery porous layer as set forth in claim 1, wherein:
   the inorganic filler contains silicon (Si) and/or a silicon compound; and
   the inorganic filler contains the silicon (Si) in an amount of not more than 2,000 ppm relative to a total weight of the inorganic filler.

7. A laminated body comprising:
   a porous base material containing a polyolefin-based resin in an amount of not less than 50% by volume; anda nonaqueous electrolyte secondary battery porous layer recited in claim 1,
   the nonaqueous electrolyte secondary battery porous layer being laminated on at least one surface of the porous base material.

8. A nonaqueous electrolyte secondary battery separator comprising:
   a porous base material containing a polyolefin-based resin in an amount of not less than 50% by volume; and
   a nonaqueous electrolyte secondary battery porous layer recited in claim 1,
   the nonaqueous electrolyte secondary battery porous layer being laminated on at least one surface of the porous base material.

9. A nonaqueous electrolyte secondary battery electrode comprising:
   one of a cathode sheet and an anode sheet; and
   a nonaqueous electrolyte secondary battery porous layer recited in claim 1,
   the nonaqueous electrolyte secondary battery porous layer being laminated on at least one surface of the one of the cathode sheet and the anode sheet.

10. A nonaqueous electrolyte secondary battery member comprising:
    a cathode;
    a nonaqueous electrolyte secondary battery porous layer recited in claim 1; and
    an anode,
    the cathode, the nonaqueous electrolyte secondary battery porous layer, and the anode being provided in this order.

11. A nonaqueous electrolyte secondary battery comprising:
    a nonaqueous electrolyte secondary battery porous layer recited in claim 1.

* * * * *